(12) United States Patent
Tsuchiya

(10) Patent No.: US 12,072,552 B2
(45) Date of Patent: Aug. 27, 2024

(54) WIDE-ANGLE LENS

(71) Applicant: NIDEC SANKYO CORPORATION, Nagano (JP)

(72) Inventor: Tsukasa Tsuchiya, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 516 days.

(21) Appl. No.: 17/427,661

(22) PCT Filed: Jan. 9, 2020

(86) PCT No.: PCT/JP2020/000400
§ 371 (c)(1),
(2) Date: Aug. 2, 2021

(87) PCT Pub. No.: WO2020/162094
PCT Pub. Date: Aug. 13, 2020

(65) Prior Publication Data
US 2022/0146797 A1    May 12, 2022

(30) Foreign Application Priority Data

Feb. 6, 2019 (JP) .................................. 2019-019787

(51) Int. Cl.
*G02B 9/60* (2006.01)
*G02B 13/06* (2006.01)
*G02B 13/18* (2006.01)

(52) U.S. Cl.
CPC .............. *G02B 9/60* (2013.01); *G02B 13/06* (2013.01); *G02B 13/18* (2013.01)

(58) Field of Classification Search
CPC ........... G02B 9/60; G02B 13/06; G02B 13/18
(Continued)

(56) References Cited

U.S. PATENT DOCUMENTS 8,134,787 B2    3/2012   Saitoh
9,599,789 B2    3/2017   Yamakawa
(Continued)

FOREIGN PATENT DOCUMENTS

CN    101796449    8/2010
CN    104914553    9/2015
(Continued)

OTHER PUBLICATIONS

Wikipedia webpage "Lens" as of May 2018 (Year: 2018).*
(Continued)

*Primary Examiner* — George G. King
(74) *Attorney, Agent, or Firm* — JCIPRNET

(57) ABSTRACT

To provide a wide-angle lens having a four-group, five-lens configuration and capable of increasing an angle while maintaining productivity of a second lens and an object-to-image distance of an entire lens system is reduced. A wide-angle lens has a four-group, five-lens configuration. A second lens, a third lens, a fourth lens, and a fifth lens are plastic lenses, and the fourth lens and the fifth lens constitute a cemented lens. A refractive index n1 of the first lens is 1.839, which satisfies the following conditional expression (1), $1.800 < n1$    Conditional expression (1), As a ratio between a focal length f2 of the second lens and a focal length f0 of an entire lens system, f2/f0 is −2.680, and satisfies the following conditional expression (2), $-3.000 < f2/f0 < -2.500$    Conditional expression (2).

5 Claims, 15 Drawing Sheets

(58) Field of Classification Search
USPC .................................................. 359/714, 725
See application file for complete search history.

(56) References Cited

U.S. PATENT DOCUMENTS

| | | |
|---|---|---|
| 2010/0188757 A1 | 7/2010 | Saitoh |
| 2014/0340767 A1 | 11/2014 | Mori et al. |
| 2014/0347494 A1 | 11/2014 | Yamazaki et al. |
| 2015/0260956 A1 | 9/2015 | Yamakawa |
| 2015/0316746 A1 | 11/2015 | Mori et al. |
| 2015/0316747 A1 | 11/2015 | Mori et al. |
| 2016/0252707 A1 | 9/2016 | Emi |
| 2016/0259153 A1 | 9/2016 | Yamazaki et al. |
| 2017/0045711 A1 | 2/2017 | Yamazaki et al. |
| 2017/0212335 A1 | 7/2017 | Yamazaki et al. |
| 2018/0196232 A1 | 7/2018 | Emi |
| 2019/0072746 A1 | 3/2019 | Yamazaki et al. |
| 2020/0192066 A1* | 6/2020 | Lai .................. G02B 13/06 |
| 2020/0393646 A1 | 12/2020 | Yamazaki et al. |

FOREIGN PATENT DOCUMENTS

| | | |
|---|---|---|
| CN | 107219608 | 9/2017 |
| JP | 2009063877 | 3/2009 |
| JP | 2013205715 | 10/2013 |
| JP | 2014089349 | 5/2014 |
| JP | 2014228570 | 12/2014 |
| JP | 2015172655 | 10/2015 |
| WO | 2015072094 | 5/2015 |

OTHER PUBLICATIONS

"Office Action of China Counterpart Application" with English translation thereof, issued on May 11, 2022, p. 1-p. 12.

"International Search Report (Form PCT/ISA/210) of PCT/JP2020/000400," mailed on Mar. 10, 2020, with English translation thereof, pp. 1-8.

* cited by examiner

WIDE-ANGLE LENS

CROSS-REFERENCE TO RELATED APPLICATION

This application is a 371 application of the international PCT application serial no. PCT/JP2020/000400, filed on Jan. 9, 2020, which claims the priority benefits of Japan application no. 2019-019787, filed on Feb. 6, 2019. The entirety of each of the above-mentioned patent applications is hereby incorporated by reference herein and made a part of this specification.

TECHNICAL FIELD

The present invention relates to a wide-angle lens used in various imaging systems.

BACKGROUND ART

A four-group, five-lens configuration has been proposed for a wide-angle lens (see Patent Literature 1). The wide-angle lens described in Patent Literature 1 includes a first lens, a second lens, a third lens, a diaphragm, a fourth lens, and a fifth lens that are arranged in this order from an object side, in which the first lens is a negative lens whose lens surface on an image side is a concave curved surface, the second lens is a negative lens whose lens surface on the image side is a concave curved surface, the third lens is a positive lens whose lens surface on the image side is a convex curved surface, and the fourth lens is a negative lens whose lens surface on the image side is a concave curved surface. The fifth lens is a biconvex lens in which both of a lens surface on the object side and a lens surface on the image side are convex curved surfaces, and constitutes a cemented lens with the fourth lens.

In the wide-angle lens described in Patent Literature 1, a lens material having a refractive index of approximately 1.5 is used for the first lens, and the second lens is a meniscus lens. Accordingly, in order to ensure negative power in the first lens and the second lens, the lens surface on the image side of the second lens is a deep concave curved surface.

CITATION LIST

Patent Literature

[Patent Literature 1] Japanese Unexamined Patent Application Publication No. 2009-63877

SUMMARY OF THE INVENTION

Problems to be Solved by the Invention

In the wide-angle lens described in Patent Literature 1, the lens surface on the image side of the second lens is the deep concave curved surface. For this reason, when the second lens is molded, it is difficult to fill a mold with a resin, which increases a molding time, for example, and thus makes it difficult to manufacture the second lens. Thus, production efficiency of the second lens is likely to be reduced, and a yield rate thereof is likely to be reduced.

In view of the above problems, the present invention has a purpose of providing a wide-angle lens having a four-group, five-lens configuration and capable of making a lens surface of a second lens a shallow concave curved surface.

Means for Solving the Problem

In order to solve the above problems, a wide-angle lens according to the present invention includes: a plurality of lenses; and a diaphragm. The plurality of lenses are a first lens, a second lens, a third lens, a fourth lens, and a fifth lens that are arranged in this order from an object side. The diaphragm is arranged between the third lens and the fourth lens. The first lens is a negative meniscus lens in which a lens surface on an image side is a concave curved surface. The second lens is a biconcave lens in which both of a lens surface on the object side and a lens surface on the image side are concave curved surfaces. The third lens is a biconvex lens in which both of a lens surface on the object side and a lens surface on the image side are convex curved surfaces. The fourth lens is a negative lens in which a lens surface on the image side is a concave curved surface. The fifth lens is a biconvex lens in which both of a lens surface on the object side and a lens surface on the image side are convex curved surfaces. when a refractive index of the first lens is set as n1, a focal length of the second lens is set as f2, and a focal length of an entire lens system is set as f0, the refractive index n1, the focal length f2, and the focal length f0 satisfy both of the following conditional expressions, $$1.800 < n1$$

$$-3.000 < f2/f0 < -2.500.$$

In the present invention, the first lens has the refractive index n1 exceeding 1.800 and has large negative power. Meanwhile, since the second lens is the biconcave lens, the second lens 20 has large negative power. Accordingly, by increasing the negative power of each of the first lens and the second lens, various aberrations can appropriately be corrected, and in particular, a chromatic aberration can appropriately be corrected. In this case, the lens surface on the image side of the second lens can be made to a shallow concave curved surface, and the second lens can have a structure that is easily manufactured. Therefore, it is possible to reduce a yield rate, improve production efficiency, and the like of the second lens. Since the refractive index n1 of the first lens exceeds 1.800, it is possible to reduce diameters of the lens surfaces of the first lens. Accordingly, the first lens can be downsized, and thus the wide-angle lens can be downsized. In addition, since f2/f0 is a value that is closer to 0 than −3.000, the various aberrations can appropriately be corrected. In addition, since f2/f0 is smaller than −2.500, the lens surface on the image side of the second lens does not have to be a deep concave curved surface. Accordingly, the second lens can have the structure that is easily manufactured. Therefore, it is possible to reduce the yield rate, improve the production efficiency, and the like of the second lens.

In the present invention, such an aspect can be adopted that all of the second lens, the third lens, the fourth lens, and the fifth lens are plastic lenses. According to such an aspect, it is possible to reduce cost of the wide-angle lens. In addition, since the second lens, the third lens, the fourth lens, and the fifth lens are the plastic lenses, the second lens, the third lens, the fourth lens, and the fifth lens can easily be made to aspheric lenses.

In the present invention, such an aspect can be adopted that, when a radius of curvature of the lens surface on the image side of the second lens is set as R22, and a distance on an optical axis between the lens surface on the image side of the second lens and the lens surface on the object side of the third lens is set as d23, the radius of curvature R22 and the distance d23 satisfy the following conditional expression, $$1.000 < R22/d23 < 2.500.$$

According to such an aspect, since R22/d23 exceeds 1.000, the lens surface on the image side of the second lens can be made to the shallow concave curved surface. Accordingly, the second lens can have the structure that is easily manufactured. Therefore, it is possible to reduce the yield rate, improve the production efficiency, and the like of the second lens. In addition, since R22/d23 is smaller than 2.500, a chromatic aberration of magnification can easily be corrected.

In the present invention, such an aspect can be adopted that, when a focal length of the first lens is set as f1, the focal length f1 and the focal length f0 satisfy the following conditional expression, $$-5.000 < f1/f0 < -1.000.$$

According to such an aspect, since f1/f0 is a value that is closer to 0 than −5.000, the various aberrations can appropriately be corrected, and in particular, the chromatic aberration of magnification can appropriately be corrected. In addition, since the negative power that is required to obtain a wide field angle can be obtained with the first lens, the lens surface on the image side of the second lens can be made to the shallow concave curved surface. Accordingly, the second lens can have the structure that is easily manufactured. Therefore, it is possible to reduce the yield rate, improve the production efficiency, and the like of the second lens. In addition, since f1/f0 is smaller than −1.000, it is possible to suppress a radius of curvature of the lens surface on the image side of the first lens from becoming excessively small. Accordingly, the first lens can have a structure that is easily manufactured. Therefore, it is possible to reduce a yield rate, improve production efficiency, and the like of the first lens.

In the present invention, such an aspect can be adopted that, when a composite focal length of the first lens and the second lens is set as f12, the composite focal length f12 and the focal length f0 satisfy the following conditional expression, $$-2.500 < f12/f0 < -0.500.$$

According to such an aspect, since f12/f0 is a value that is closer to 0 than −2.500, the various aberrations can appropriately be corrected, and in particular, image surface curvature can be suppressed to be small. In addition, since f12/f0 is smaller than −0.500, a viewing angle can be increased.

In the present invention, such an aspect can be adopted that, when a composite focal length of the first lens and the second lens is set as f12, and a composite focal length of the third lens, the fourth lens, and the fifth lens is set as f345, the composite focal lengths f12 and f345 satisfy the following conditional expression, $$-1.000 < f12/f345 < 0.$$

According to such an aspect, the overall aberrations can be reduced. In addition, since f12/f345 is a negative value, a change in the focal length caused by a temperature change can be suppressed to be small.

Effect of the Invention

In the present invention, the first lens has the refractive index n1 exceeding 1.800 and has the large negative power. Meanwhile, since the second lens is the biconcave lens, the second lens 20 has the large negative power. Accordingly, by increasing the negative power of each of the first lens and the second lens, the various aberrations can appropriately be corrected, and in particular, the chromatic aberration can appropriately be corrected. In this case, the lens surface on the image side of the second lens can be made to the shallow concave curved surface, and the second lens can have the structure that is easily manufactured. Therefore, it is possible to reduce the yield rate, improve the production efficiency, and the like of the second lens. Since the refractive index n1 of the first lens exceeds 1.800, it is possible to reduce the diameters of the lens surfaces of the first lens. Accordingly, the first lens can be downsized, and thus the wide-angle lens can be downsized. In addition, since f2/f0 is the value that is closer to 0 than −3.000, the various aberrations can appropriately be corrected. In addition, since f2/f0 is smaller than −2.500, the lens surface on the image side of the second lens does not have to be the deep concave curved surface. Accordingly, the second lens can have the structure that is easily manufactured. Therefore, it is possible to reduce the yield rate, improve the production efficiency, and the like of the second lens.

MODE FOR CARRYING OUT THE INVENTION

A description will be made on first, second, and third embodiments as a wide-angle lens 100, to which the present invention is applied. In the invention of the present application, a "lens surface diameter (Diameter)" refers to an optical effective diameter in a lens surface. The effective diameter is a diameter of a circle that is formed of the outermost points in a radial direction (farthest points from an optical axis) when a point of intersection between all light beams contributing to image formation and the lens surface is considered. A "sag amount (Sag)" is a distance from a point on an optical axis L of an imaginary reference plane at the outermost circumference of the effective diameter of the lens surface to a point on the optical axis L of the lens surface when an imaginary plane that is orthogonal to the optical axis is set as the imaginary reference plane. When the sag amount has a positive value, the point on the optical axis L in the imaginary reference plane is located on an object side from the point on the optical axis L of the lens surface. When the sag amount has a negative value, the point on the optical axis L in the imaginary reference plane is located on an image side from the point on the optical axis L of the lens surface.

First Embodiment (Overall Configuration)

Figure 1:
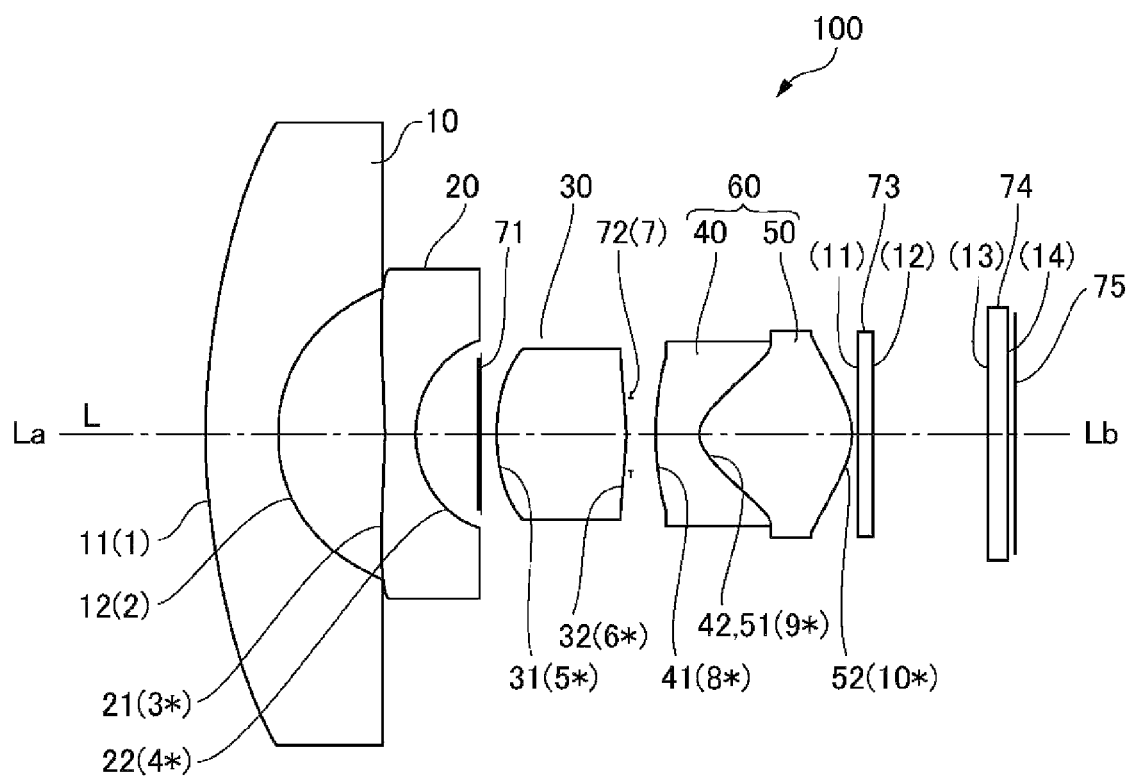
FIG. 1 is an explanatory view of a wide-angle lens according to a first embodiment of the present invention.
Figure 2:
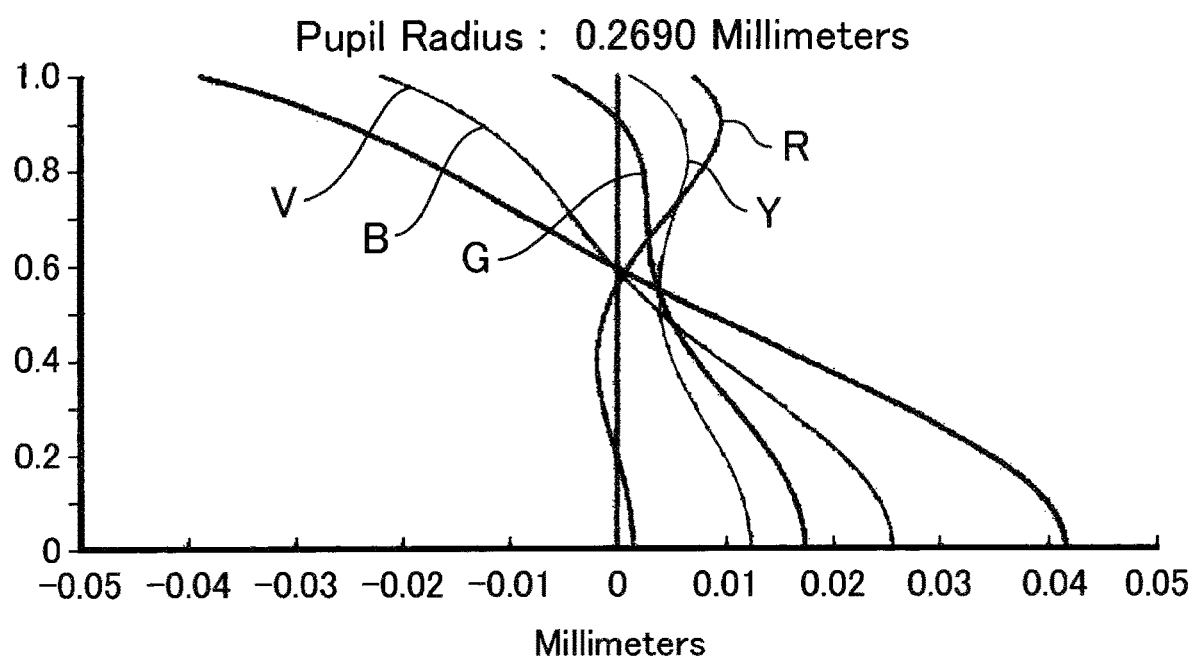
FIG. 2 is an explanatory graph showing a spherical aberration of the wide-angle lens shown in FIG. 1.
Figure 3:
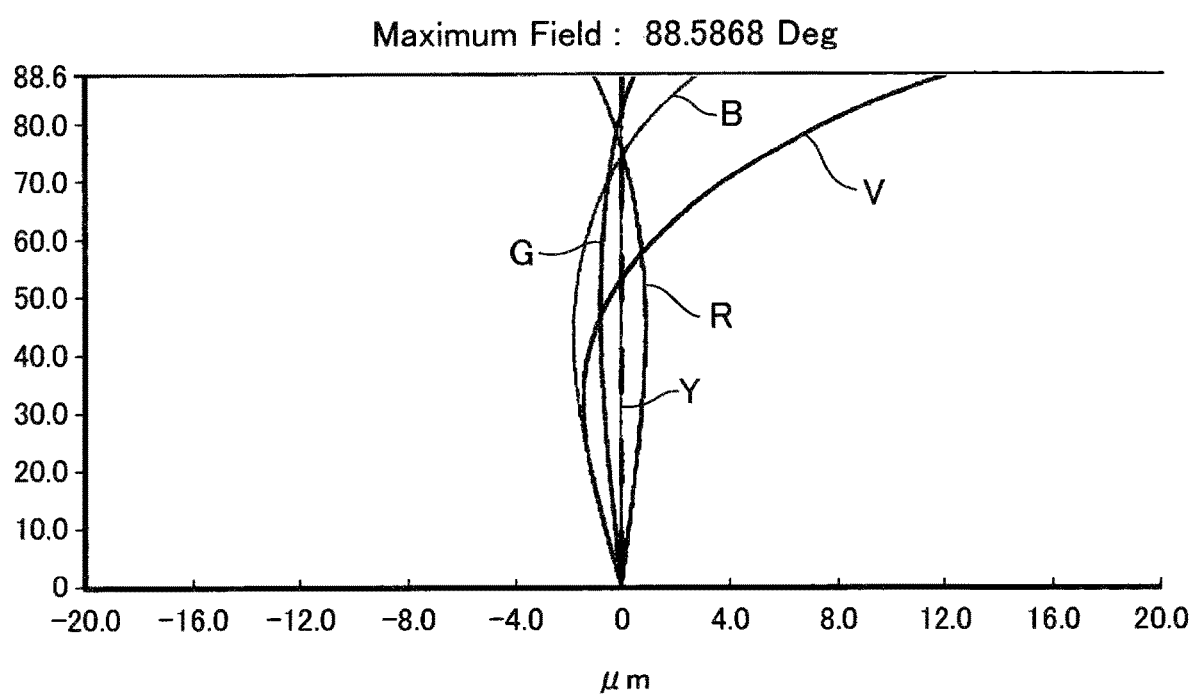
FIG. 3 is an explanatory graph showing a chromatic aberration of magnification of the wide-angle lens shown in FIG. 1.
Figure 4:
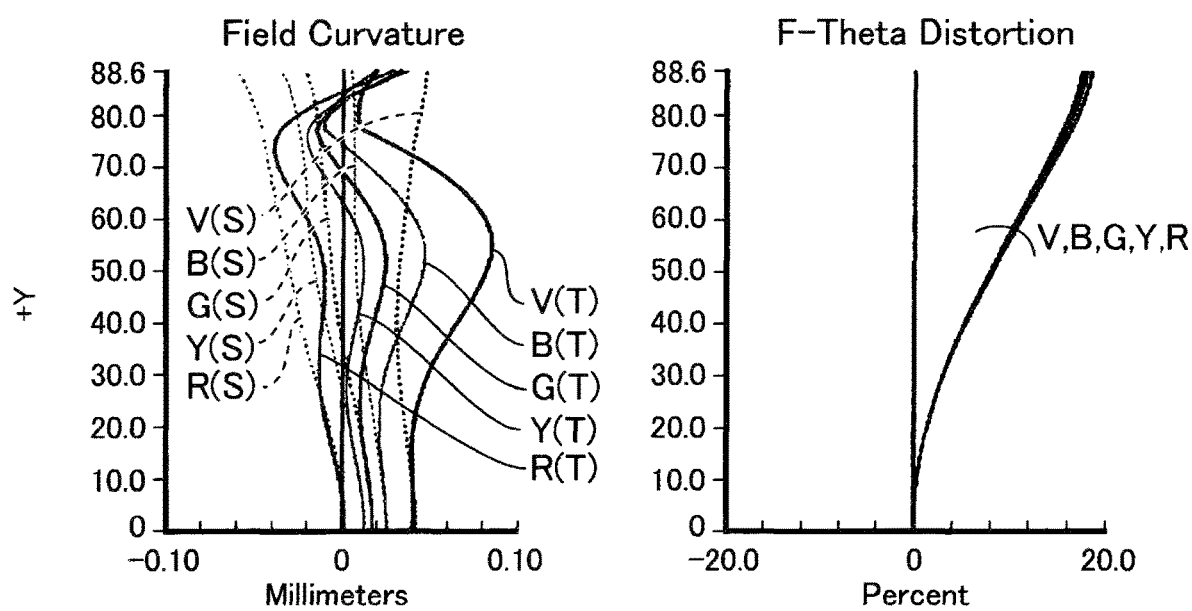
FIG. 4 includes explanatory graphs showing astigmatism and distortion of the wide-angle lens shown in FIG. 1.
Figure 5:
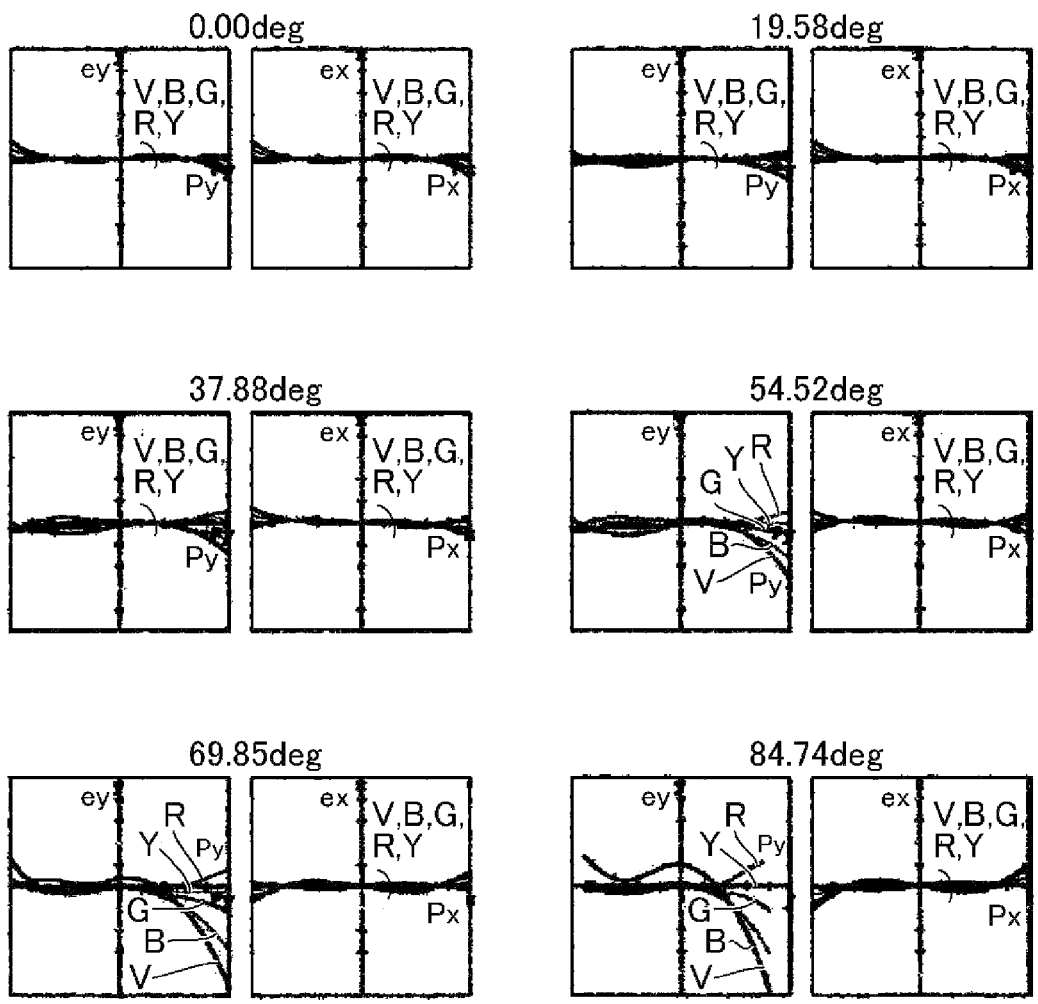
FIG. 5 includes explanatory views showing a lateral aberration of the wide-angle lens shown in FIG. 1.

FIG. 1 is an explanatory view of the wide-angle lens 100 according to the first embodiment of the present invention. FIG. 2 is an explanatory graph showing a spherical aberration of the wide-angle lens 100 shown in FIG. 1. FIG. 3 is an explanatory graph showing a chromatic aberration of magnification of the wide-angle lens 100 shown in FIG. 1, and shows the chromatic aberration of magnification at a maximum field angle. FIG. 4 includes explanatory graphs showing astigmatism and distortion of the wide-angle lens 100 shown in FIG. 1. FIG. 5 includes explanatory views showing a lateral aberration of the wide-angle lens 100 shown in FIG. 1. In FIG. 1, surface numbers (Surf) are each indicated in parentheses, and aspheric surfaces are each added with * following the surface number.

FIG. 2, FIG. 3, FIG. 4, and FIG. 5 each show the aberration in each of red light R (wavelength: 656 nm), yellow light Y (wavelength: 588 nm), green light G (wavelength: 546 nm), blue light B (wavelength: 486 nm), and violet light V (wavelength: 436 nm). In regard to the astigmatism shown in FIG. 4, characteristics in a sagittal direction are added with S, and characteristics in a tangential direction are added with T. The distortion shown in FIG. 4 represents a change ratio of the image between a central portion and a peripheral portion of the image. It can be said that precision of the lens is increased with a reduction in an absolute value of a numerical value representing the distortion. FIG. 5 collectively shows the lateral aberrations of each of the red light R, the yellow light Y, the green light G, the blue light B, and the violet light V in two directions (a y-direction and an x-direction), which are orthogonal to the optical axis, at angles of 0.00 deg, 19.58 deg, 37.88 deg, 54.52 deg, 69.85 deg, and 84.74 deg.

As shown in FIG. 1, the wide-angle lens 100 of this embodiment includes a plurality of lenses and a diaphragm 72. The plurality of lenses are a first lens 10, a second lens 20, a third lens 30, a fourth lens 40, and a fifth lens 50 that are arranged in this order from an object side La, and the diaphragm 72 is arranged between the third lens 30 and the fourth lens 40. In this embodiment, a flat plate-shaped infrared filter 73, a translucent cover 74, and an imaging element 75 are arranged in this order on an image side Lb from the fifth lens 50. In this embodiment, a projection method of the wide-angle lens 100 is a stereographic projection method by which a peripheral image is larger than a central image.

A configuration and the like of each of the lens in the wide-angle lens 100 in this embodiment are as shown in Table 1, and Table 1 shows the following characteristics as characteristics of the wide-angle lens 100.

Focal length f0 of an entire lens system (Effective Focal Length)
Object-to-image distance (Total Track)
F value of the entire lens system (Image Space)
Maximum field angle (Max. Field Angle)

In addition, Table 1 shows the following items for each surface.

Radius of curvature (Radius)
Thickness (Thickness)
Refractive index Nd
Abbe number vd
Focal length f
Effective diameter of the lens surface (Diameter)
Sag amount (Sag)

Units of the radius of curvature, the thickness, the focal length, the effective diameter, and the sag amount are mm. Here, in the case where the lens surface is a convex surface protruding toward the object side La or a concave surface recessed toward the object side La, the radius of curvature is set to have a positive value. In the case where the lens surface is a convex surface protruding toward the image side Lb or a concave surface recessed toward the image side Lb, the radius of curvature is set to have a negative value. In addition, the focal length of the positive lens (the lens with positive power) is set to have a positive value, and the focal length of the negative lens (a lens with negative power) is set to have a negative value. The focal length that is listed in each of Tables is obtained by using the light beam at the wavelength of 546 nm and by a calculation using a refractive index of each of the lens materials at the wavelength of 546 nm.

TABLE 1

| Effective Focal Length | 1.295 mm |
| Total Track | 15.472 mm |
| Image Space F/# | 2.400 |
| Max. Field of Angle | 177.163 deg |

| Surf | Radius | Thickness | Nd | vd | f | f | f | Diameter | Sag |
|---|---|---|---|---|---|---|---|---|---|
| (1) | 14.180 | 1.400 | 1.839 | 42.72 | −4.807 | −1.601 | 55.460 | 12.000 | 1.332 |
| (2) | 3.000 | 2.020 | | | | | | 5.640 | 1.976 |
| (3*) | −16.850 | 0.600 | 1.539 | 55.98 | −3.471 | | | 6.400 | 0.100 |
| (4*) | 2.130 | 1.531 | | | | | | 3.700 | 1.220 |
| (5*) | 3.880 | 2.490 | 1.646 | 23.49 | 4.330 | 3.910 | | 3.400 | 0.528 |
| (6*) | −7.480 | 0.090 | | | | | | 3.400 | −0.070 |
| (7(stop)) | Infinity | 0.471 | | | | | | | |
| (8*) | 4.220 | 0.840 | 1.587 | 30.17 | −1.081 | | 3.596 | 3.000 | 0.199 |

TABLE 1-continued

| | | | | | | | |
|---|---|---|---|---|---|---|---|
| (9*) | 0.511 | 2.911 | 1.539 | 55.98 | 1.278 | 3.600 | 1.364 |
| (10*) | −1.971 | 0.109 | | | | 4.000 | −0.754 |
| (11) | Infinity | 0.300 | | | | | |
| (12) | Infinity | 2.185 | | | | | |
| (13) | Infinity | 0.400 | | | | | |
| (14) | Infinity | 0.125 | | | | | |

Table 2 shows aspheric coefficients A4, A6, A8, A10 at the time when a shape of an aspheric lens used in the wide-angle lens 100 of this embodiment is expressed by the following formula (Formula 1). In the following formula, the sag amount (an axis of in an optical axis direction), a height in a perpendicular direction to the optical axis (a light beam height), a conical coefficient, and a reciprocal of the radius of curvature are respectively denoted by z, r, K, c.

TABLE 2

| Surf | c (1/Radius) | K | A4 | A6 | A8 | A10 |
|---|---|---|---|---|---|---|
| (3*) | −5.93472E−02 | 0.00000E+00 | 3.39770E−03 | 1.24330E−03 | −2.79520E−04 | 1.58900E−05 |
| (4*) | 3.33333E−01 | 0.00000E+00 | −1.53320E−02 | 7.25670E−03 | 2.52980E−04 | 0.00000E+00 |
| (5*) | 2.57732E−01 | 0.00000E+00 | 1.20750E−03 | 5.18720E−03 | 0.00000E+00 | 0.00000E+00 |
| (6*) | −1.33690E−01 | 0.00000E+00 | −2.86110E−03 | 1.70360E−02 | −3.75310E−03 | 0.00000E+00 |
| (8*) | 2.36967E−01 | 0.00000E+00 | −5.01640E−02 | 2.60950E−02 | −4.68840E−03 | 0.00000E+00 |
| (9*) | 1.95695E+00 | −1.46000E+00 | −3.60230E−02 | 7.53790E−03 | −1.50790E−03 | −3.20340E−04 |
| (10*) | −5.07357E−01 | −8.54000E−01 | 8.76280E−03 | 1.86020E−03 | −9.05880E−04 | 2.68180E−04 |

$$Z = \frac{cr^2}{1 + \sqrt{1 - (1+K)c^2 r^2}} + \sum_{n=2}^{5} A_{2n} r^{2n} \quad \text{[Formula 1]}$$

As shown in Table 1, in the wide-angle lens 100 of this embodiment, the focal length f0 of the entire lens system is 1.295 mm, the object-to-image distance is 15.472 mm, the F value of the entire lens system is 2.400, and the maximum field angle is 177.163 deg.

The first lens 10 is a negative meniscus lens in which a lens surface 12 (a second surface (2)) on the image side Lb is a concave curved surface, and a lens surface 11 (a first surface (1)) on the object side La is a convex curved surface. The first lens 10 is a glass lens, and the lens surface 11 (the first surface (1)) and the lens surface 12 (the second surface (2)) are spherical. A lens material having a refractive index of 1.839 and an Abbe number of 42.72 is used for the first lens 10, and a focal length thereof is −4.807 mm.

The second lens 20 is a biconcave lens in which both of a lens surface 21 (a third surface (3)) on the object side La and a lens surface 22 (a fourth surface (4)) on the image side Lb are concave curved surfaces, and has the negative power. The second lens 20 is a plastic lens that is made from an acrylic resin system, a polycarbonate system, a polyolefin system, or the like, and the lens surface 21 (the third surface (3)) and the lens surface 22 (the fourth surface (4)) are aspheric. A lens material having a refractive index of 1.539 and an Abbe number of 55.98 is used for the second lens 20, and a focal length thereof is −3.471 mm.

The third lens 30 is a biconvex lens in which both of a lens surface 31 (a fifth surface (5)) on the object side La and a lens surface 32 (a sixth surface (6)) on the image side Lb are convex curved surfaces, and has the positive power. The third lens 30 is the plastic lens that is made from the acrylic resin system, the polycarbonate system, the polyolefin system, or the like, and the lens surface 31 (the fifth surface (5)) and the lens surface 32 (the sixth surface (6)) are aspheric. A lens material having a refractive index of 1.646 and an Abbe number of 23.49 is used for the third lens 30, and a focal length thereof is 4.330 mm. A seventh surface (7) is configured by a surface on the object side La of the diaphragm 72.

The fourth lens 40 is a negative lens in which a lens surface 42 on the image side Lb is a concave curved surface. In this embodiment, a lens surface 41 (an eighth surface (8)) on the object side La of the fourth lens 40 is a convex curved surface, and the fourth lens 40 is a negative meniscus lens. The fourth lens 40 is the plastic lens that is made from the acrylic resin system, the polycarbonate system, the polyolefin system, or the like, and the lens surface 41 (the eighth surface (8)) and the lens surface 42 are aspheric. A lens material having a refractive index of 1.587 and an Abbe number of 30.17 is used for the fourth lens 40, and a focal length thereof is −1.081 mm.

The fifth lens 50 is a biconvex lens in which both of a lens surface 51 on the object side La and a lens surface 52 (a tenth surface (10)) on the image side Lb are convex curved surfaces. The fifth lens 50 is the plastic lens that is made from the acrylic resin system, the polycarbonate system, the polyolefin system, or the like, and the lens surface 51 and the lens surface 52 (the tenth surface (10)) are aspheric. A lens material having a refractive index of 1.539 and an Abbe number of 55.98 is used for the fifth lens 50, and a focal length thereof is 1.278 mm.

Here, the lens surface 42 on the image side Lb of the fourth lens 40 and the lens surface 51 on the object side La of the fifth lens 50 are formed in the same shape, and the fourth lens 40 and the fifth lens 50 constitute a cemented lens 60 in which the lens surface 42 on the image side Lb of the fourth lens 40 and the lens surface 51 on the object side La of the fifth lens 50 are joined by a resin material. Accordingly, a joint surface between the lens surface 42 on the image side Lb of the fourth lens 40 and the lens surface 51 on the object side La of the fifth lens 50 is set as a ninth surface (9). In this embodiment, the resin material is a UV-curable adhesive. The adhesive is preferably a material that remains elastic after being cured.

A surface on the object side La of the infrared filter 73 constitutes an eleventh surface (11), and a surface on the image side Lb thereof constitutes a twelfth surface (12). A surface on the object side La of the cover 74 constitutes a thirteenth surface (13). A surface on the image side Lb of the cover 74 constitutes a fourteenth surface (14).

In the thus-configured wide-angle lens 100, a composite focal length f123 of the lenses in a front group (the first lens 10, the second lens 20, and the third lens 30) that is located on the object side La from the diaphragm 72 is 55.460 mm, and a composite focal length f45 of the lenses in a rear group (the cemented lens 60) that is located on the object side La from the diaphragm 72 is 3.596 mm. A composite focal length f12 of the first lens 10 and the second lens 20 is −1.601 mm, and a composite focal length f345 of the third lens 30 and the cemented lens 60 (the fourth lens 40 and the fifth lens 50) is 3.910 mm.

In such a wide-angle lens 100, since all of the second lens 20, the third lens 30, the fourth lens 40, and the fifth lens 50 are the plastic lenses, it is possible to reduce cost of the wide-angle lens 100. In addition, since the second lens 20, the third lens 30, the fourth lens 40, and the fifth lens 50 are the plastic lenses, the second lens 20, the third lens 30, the fourth lens 40, and the fifth lens 50 can easily be made to the aspheric lenses.

As shown in FIG. 2 to FIG. 5, in the wide-angle lens 100 of this embodiment, the spherical aberration, the chromatic aberration of magnification, the astigmatism (the distortion), and the lateral aberration are corrected to appropriate levels.

(Conditional Expressions)

Table 3 shows values associated with conditional expressions (1) to (6), which will be described below, in the wide-angle lens 100 of this embodiment. In order to satisfy the following conditional expressions (1) to (6), the wide-angle lens 100 in this embodiment has lens characteristics shown in FIG. 2 to FIG. 5. Table 3 also shows values in a second embodiment and a third embodiment, which will be described below. The values shown in Table 3 and the values, which will be described below, are subjected to fraction processing by rounding off.

TABLE 3

| Conditional Expression | Embodiment 1 | Embodiment 2 | Embodiment 3 |
|---|---|---|---|
| (1) $1.800 < n1$ | ○ | ○ | ○ |
| (2) $-3.000 < f2/f0 < -2.500$ | −2.680 | −2.730 | −2.809 |
| (3) $1.000 < r22/d23 < 2.500$ | 1.391 | 2.415 | 1.298 |
| (4) $-5.000 < f1/f0 < -1.000$ | −3.712 | −3.712 | −3.610 |
| (5) $-2.500 < f12/f345 < 0.500$ | −1.236 | −1.215 | −1.237 |
| (6) $-1.000 < f12/f345 < 0$ | 0.409 | 0.417 | 0.440 |

In the wide-angle lens 100 of this embodiment, a refractive index n1 of the first lens 10, a focal length f2 of the second lens 20, and a focal length f0 of the entire lens system satisfy both of the following conditional expressions (1), (2).

$$1.800 < n1 \quad \text{Conditional expression (1)}$$

$$-3.000 < f2/f0 < -2.500 \quad \text{Conditional expression (2)}$$

More specifically, the refractive index n1 of the first lens 10 is 1.839, which satisfies the conditional expression (1). With such a configuration, the first lens 10 has the refractive index n1 exceeding 1.800 and has the large negative power. Meanwhile, since the second lens 20 is the biconcave lens, the second lens 20 has the large negative power. Accordingly, by increasing the negative power of each of the first lens 10 and the second lens 20, the various aberrations can appropriately be corrected, and in particular, the chromatic aberration can appropriately be corrected. In this case, since the lens surface 22 on the image side Lb of the second lens 20 can be made to a shallow concave curved surface, the second lens 20 can have a structure that is easily manufactured. Therefore, it is possible to reduce a yield rate, improve production efficiency, and the like of the second lens 20. Furthermore, since the refractive index n1 of the first lens 10 exceeds 1.800, it is possible to reduce the diameters of the lens surfaces 11, 12 of the first lens 10. Accordingly, the first lens 10 can be downsized, and thus the wide-angle lens 100 can be downsized.

The focal length f2 of the second lens 20 is −3.471 mm, and the focal length f0 of the entire lens system is 1.295 mm. Thus, f2/f0 is −2.680, which satisfies the conditional expression (2). With such a configuration, since f2/f0 is a value that is closer to 0 than −3.000, the various aberrations can appropriately be corrected. In addition, since f2/f0 is smaller than −2.500, the lens surface 22 on the image side Lb of the second lens 20 does not have to be a deep concave curved surface. Accordingly, the second lens 20 can have the structure that is easily manufactured. Therefore, it is possible to reduce the yield rate, improve the production efficiency, and the like of the second lens 20.

In the wide-angle lens 100 of this embodiment, a radius of curvature R22 of the lens surface 22 on the image side Lb of the second lens 20 and a distance d23 on the optical axis between the lens surface 22 on the image side Lb of the second lens 20 and the lens surface 31 on the object side La of the third lens 30 satisfy the following conditional expression (3).

$$1.000 < R22/d23 < 2.500 \quad \text{Conditional expression (3)}$$

More specifically, the radius of curvature R22 of the lens surface 22 on the image side Lb of the second lens 20 is 2.130 mm, and the distance d23 on the optical axis between the lens surface 22 on the image side Lb of the second lens 20 and the lens surface 31 on the object side La of the third lens 30 is 1.531. Thus, R22/d23 is 1.391, which satisfies the conditional expression (3). For this reason, the lens surface 22 on the image side Lb of the second lens 20 can be made to the shallow concave curved surface. Accordingly, the second lens 20 can have the structure that is easily manufactured. Therefore, it is possible to reduce the yield rate, improve the production efficiency, and the like of the second lens 20. In addition, since R22/d23 is smaller than 2.500, the chromatic aberration of magnification can easily be corrected.

In the wide-angle lens 100 of this embodiment, a focal length f1 of the first lens 10 and the focal length f0 of the entire lens system satisfy the following conditional expression (4).

$$-5.000 < f1/f0 < -1.000 \quad \text{Conditional expression (4)}$$

More specifically, the focal length f1 of the first lens 10 is −4.807 mm, and the focal length f0 of the entire lens system is 1.295 mm. Thus, f1/f0 is −3.712, which satisfies the conditional expression (4). With such a configuration, since f1/f0 is a value that is closer to 0 than −5.000, the various aberrations can appropriately be corrected, and in particular, the chromatic aberration of magnification can appropriately be corrected. In addition, since the negative power that is required to obtain the wide field angle can be obtained with the first lens 10, the lens surface 22 on the image side Lb of the second lens 20 can be made to the shallow concave curved surface. Accordingly, the second lens 20 can have the structure that is easily manufactured. Therefore, it is possible to reduce the yield rate, improve the production efficiency, and the like of the second lens 20. In addition, since f1/f0 is smaller than −1.000, it is possible to suppress a radius of curvature of the lens surface 12 on the image side Lb of the first lens 10 from becoming excessively small. Accordingly, the first lens 10 can have a structure that is easily manufactured. Therefore, it is possible to reduce the yield rate, improve the production efficiency, and the like of the first lens 10.

In the wide-angle lens 100 of this embodiment, the values associated with the conditional expressions (1) to (6) described in the first embodiment are shown in Table 3, and the wide-angle lens 100 in this embodiment satisfies the conditional expressions (1) to (6). Accordingly, also in the wide-angle lens 100 of this embodiment, since the lens surface 22 on the image side Lb of the second lens 20 can be made to the shallow concave curved surface, it is possible to exert similar effects to those of the first embodiment, such as the effect that the second lens 20 can have the structure that is easily manufactured.

−2.500<f12/f0<0.500    Conditional expression (5)

More specifically, the composite focal length f12 of the first lens 10 and the second lens 20 is −1.601 mm, and the focal length f0 of the entire lens system is 1.295 mm. Thus, f12/f0 is −1.236, which satisfies the conditional expression (5). With such a configuration, since f12/f0 is a value that is closer to 0 than −2.500, the various aberrations can appropriately be corrected, and in particular, image surface curvature can be suppressed to be small. In addition, since f12/f0 is smaller than −0.500, a viewing angle can be increased.

In the wide-angle lens 100 of this embodiment, the composite focal length f12 of the first lens 10 and the second lens 20 and the composite focal length f345 of the third lens 30, the fourth lens 40, and the fifth lens 50 satisfy the following conditional expression (6).

−1.000<f12/f345<0    Conditional expression (6)

More specifically, the composite focal length f12 of the first lens 10 and the second lens 20 is −1.601 mm, and the composite focal length f345 of the third lens 30, the fourth lens 40, and the fifth lens 50 is 3.910 mm. Thus, f12/f345 is 0.409, which satisfies the conditional expression (6). With such a configuration, the overall aberrations can be reduced.

In addition, since f12/f345 is a negative value, a change in the focal length caused by a temperature change can be suppressed to be small.

Second Embodiment

Figure 6:
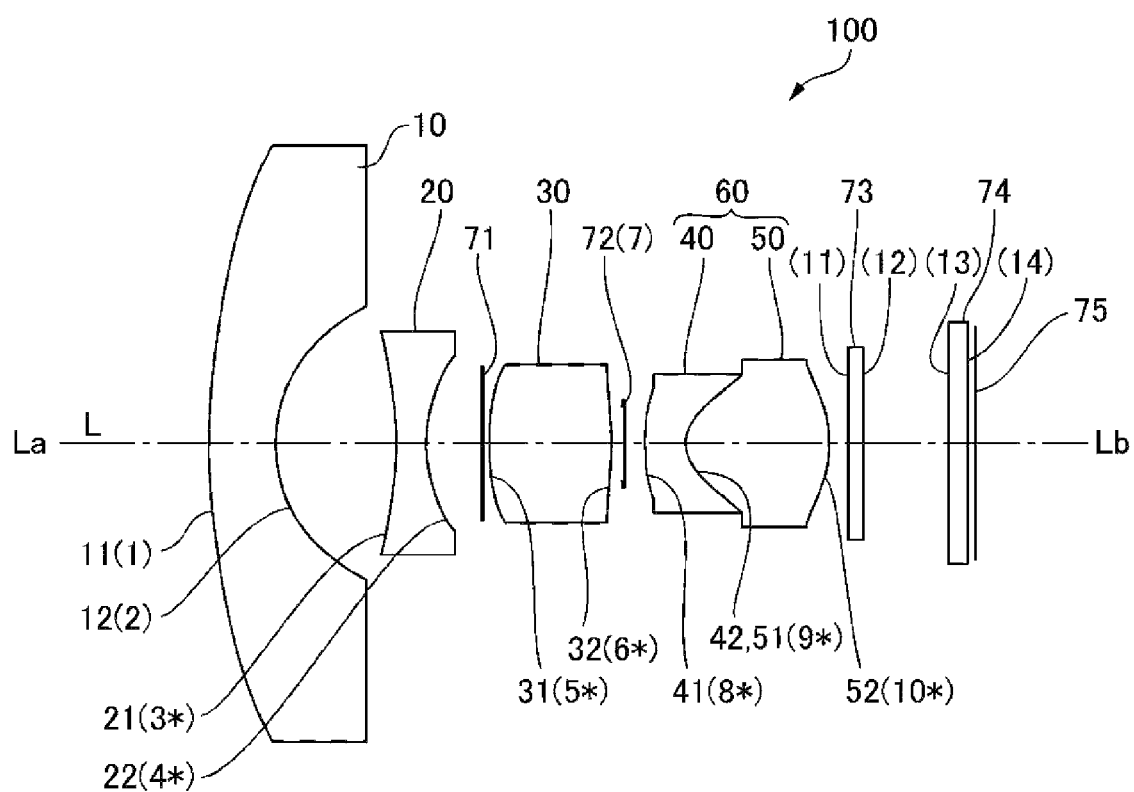
FIG. 6 is an explanatory view of a wide-angle lens according to a second embodiment of the present invention.
Figure 7:
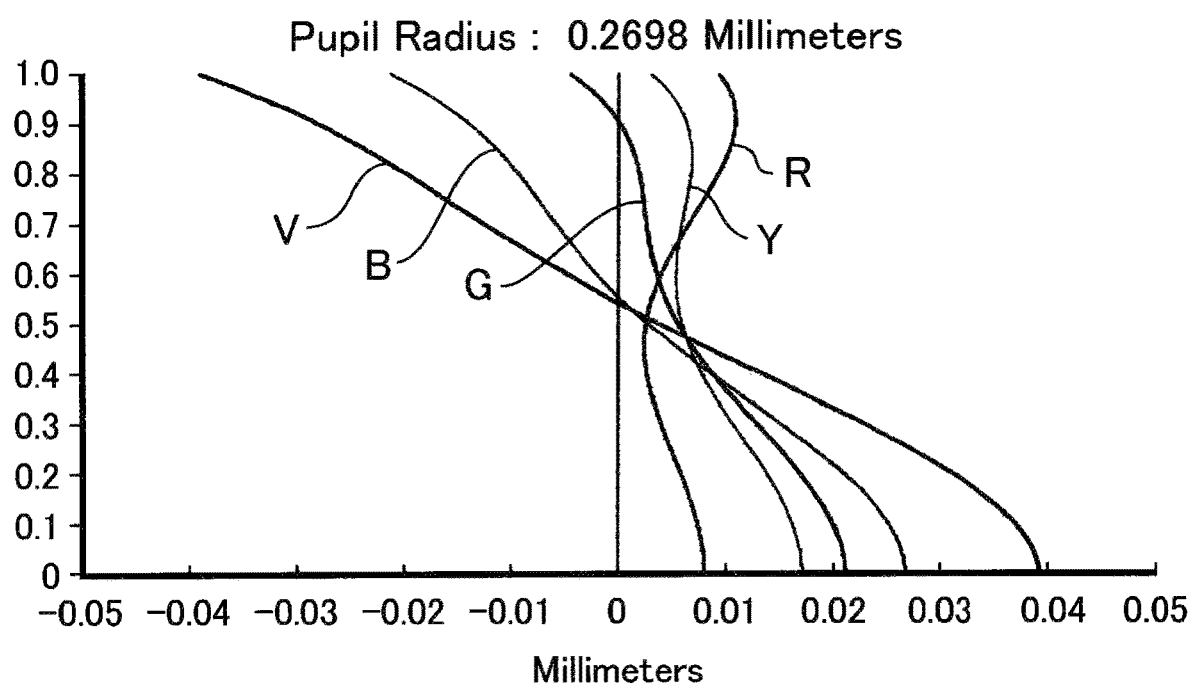
FIG. 7 is an explanatory graph showing a spherical aberration of the wide-angle lens shown in FIG. 6.
Figure 8:
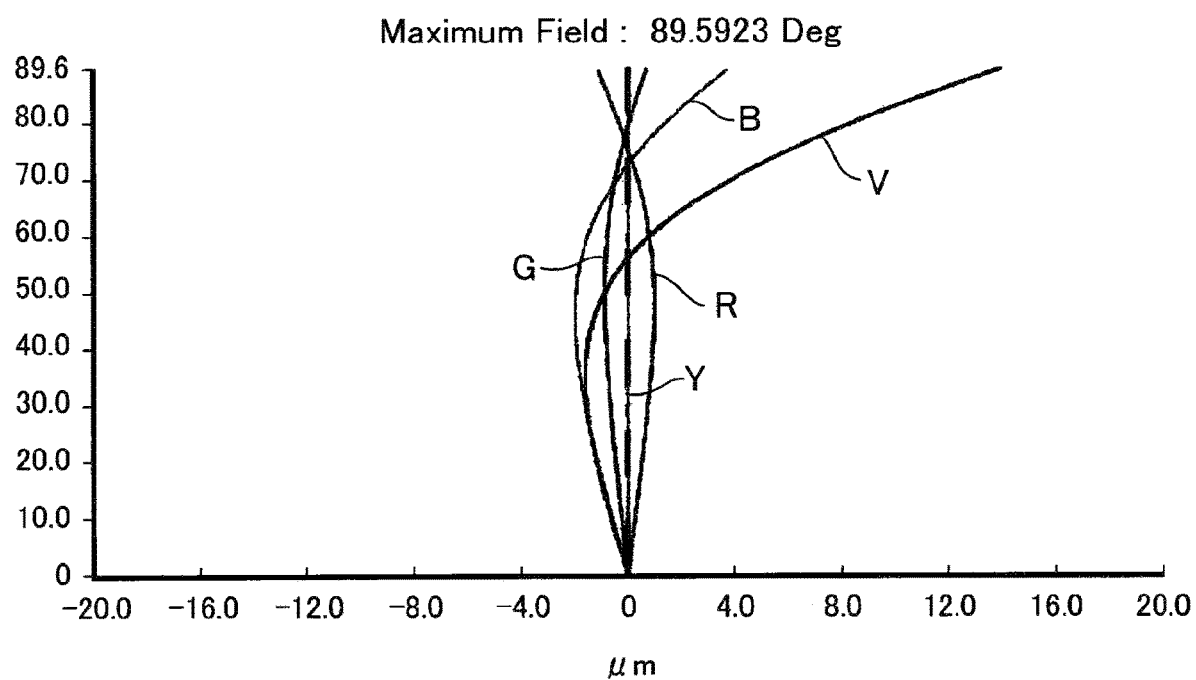
FIG. 8 is an explanatory graph showing a chromatic aberration of magnification of the wide-angle lens shown in FIG. 6.
Figure 9:
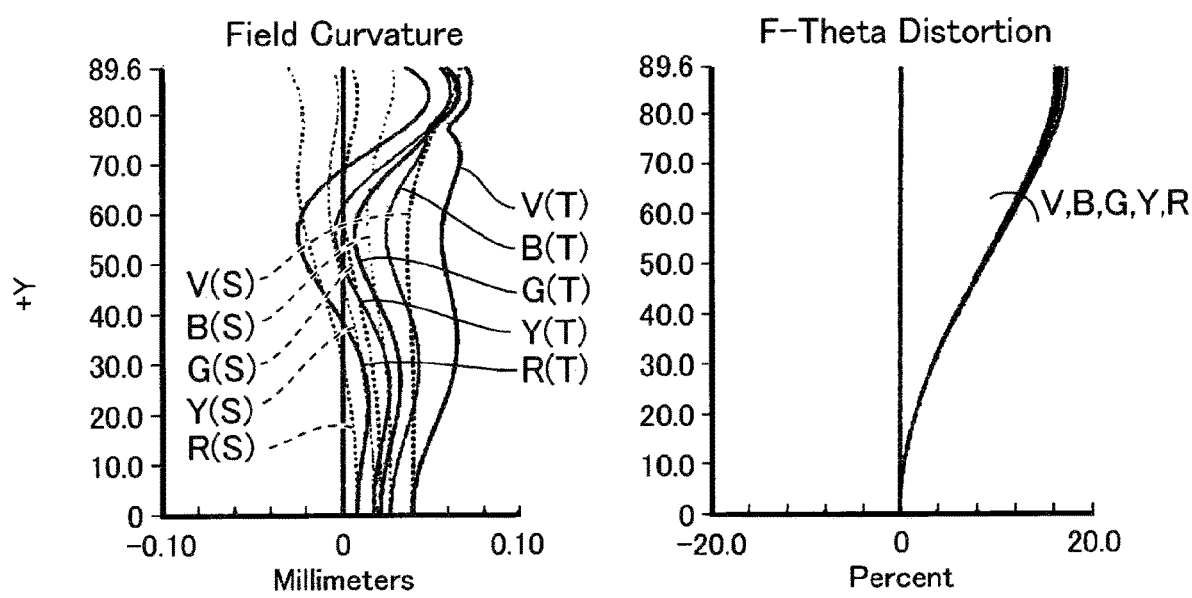
FIG. 9 includes explanatory graphs showing astigmatism and distortion of the wide-angle lens shown in FIG. 6.
Figure 10:
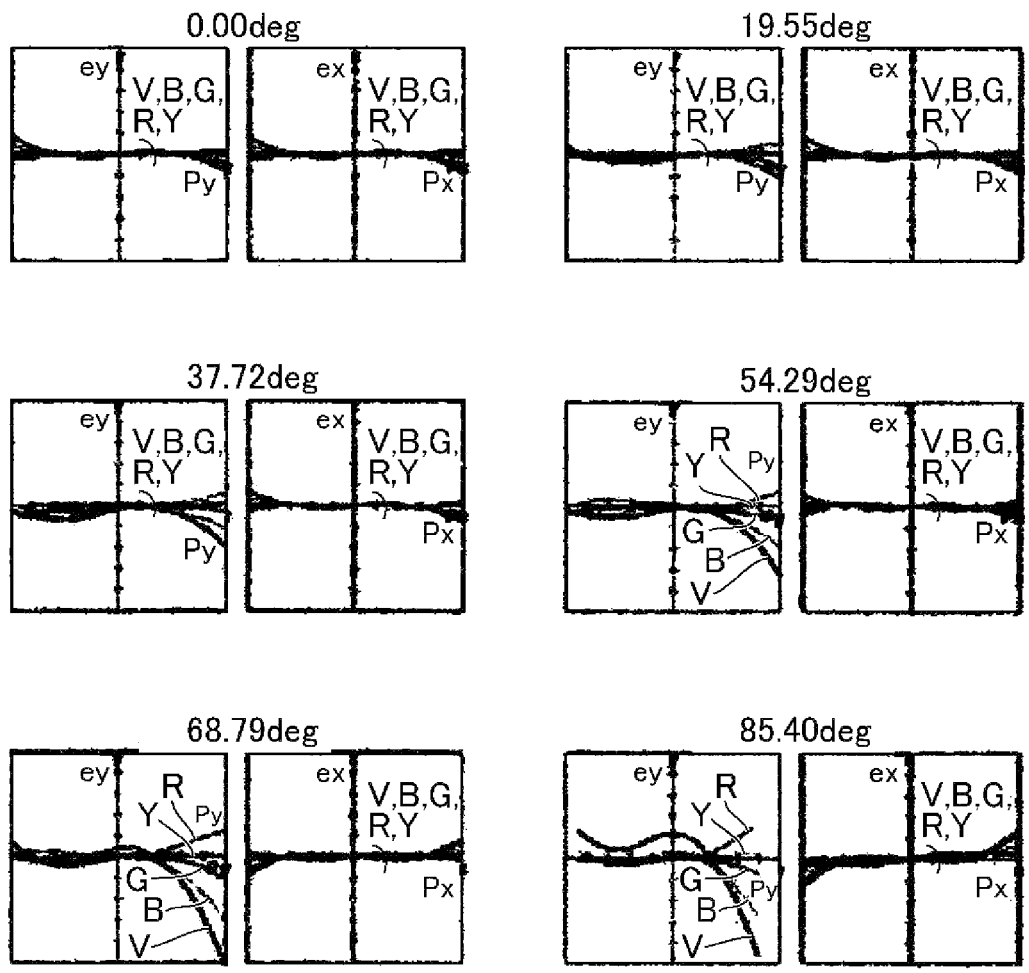
FIG. 10 includes explanatory views showing a lateral aberration of the wide-angle lens shown in FIG. 6.

FIG. 6 is an explanatory view of the wide-angle lens 100 according to the second embodiment of the present invention. FIG. 7 is an explanatory graph showing a spherical aberration of the wide-angle lens 100 shown in FIG. 6. FIG. 8 is an explanatory graph showing a chromatic aberration of magnification of the wide-angle lens 100 shown in FIG. 6, and shows a chromatic aberration of magnification at a maximum field angle. FIG. 9 includes explanatory graphs showing astigmatism and distortion of the wide-angle lens 100 shown in FIG. 6. FIG. 10 includes explanatory views showing a lateral aberration of the wide-angle lens 100 shown in FIG. 6. FIG. 10 collectively shows the lateral aberrations of the red light R, the yellow light Y, the green light G, the blue light B, and the violet light V in the two directions (the y-direction and the x-direction), which are orthogonal to the optical axis, at angles of 0.00 deg, 19.55 deg, 37.72 deg, 54.29 deg, 68.79 deg, and 85.40 deg. Since a basic configuration of this embodiment is similar to that of the first embodiment, corresponding portions will be denoted by the same reference numerals, and a description on those will not be made.

As shown in FIG. 6, similar to the first embodiment, the wide-angle lens 100 of this embodiment also includes the first lens 10, the second lens 20, an annular light-shielding sheet 71, the third lens 30, the diaphragm 72, the fourth lens 40, and the fifth lens 50 that are arranged in this order from the object side La to the image side Lb, and the flat plate-shaped infrared filter 73, the translucent cover 74, and the imaging element 75 are arranged in this order on the image side Lb from the fifth lens 50.

A configuration and the like of each of the lens of the wide-angle lens 100 in this embodiment are as shown in Table 4, and Table 5 shows the aspheric coefficients A4, A6, A8 of the aspheric lenses used for the wide-angle lens 100 in this embodiment.

TABLE 4

| Effective Focal Length | 1.295 mm |
|---|---|
| Total Track | 15.480 mm |
| Image Space F/# | 2.400 |
| Max. Field of Angle | 179.185 deg |

| Surf | Radius | Thickness | Nd | vd | f | f | f | Diameter | Sag |
|---|---|---|---|---|---|---|---|---|---|
| (1) | 14.180 | 1.400 | 1.839 | 42.72 | −4.807 | −1.573 | 84.005 | 12.000 | 1.332 |
| (2) | 3.000 | 2.430 | | | | | | 5.481 | 1.780 |
| (3*) | −5.600 | 0.600 | 1.539 | 55.98 | −3.535 | | | 5.754 | −0.451 |
| (4*) | 2.995 | 1.240 | | | | | | 4.200 | 1.209 |
| (5*) | 4.330 | 2.470 | 1.646 | 23.49 | 4.350 | 3.770 | | 3.480 | 0.451 |
| (6*) | −6.199 | 0.230 | | | | | | 2.497 | −0.090 |
| (7(stop)) | Infinity | 0.470 | | | | | | | |
| (8*) | 3.490 | 0.800 | 1.587 | 30.17 | −1.156 | | 3.646 | 2.795 | 0.261 |
| (9*) | 0.520 | 2.914 | 1.539 | 55.98 | 1.260 | | | 2.808 | 1.141 |
| (10*) | −2.136 | 0.370 | | | | | | 3.831 | −0.455 |
| (11) | Infinity | 0.300 | | | | | | | |
| (12) | Infinity | 1.731 | | | | | | | |
| (13) | Infinity | 0.400 | | | | | | | |
| (14) | Infinity | 0.125 | | | | | | | |

TABLE 5

| Surf | c (1/Radius) | K | A4 | A6 | A8 |
|---|---|---|---|---|---|
| (3*) | −1.38571E−01 | −1.69200E+01 | 0.00000E+00 | 0.00000E+00 | 0.00000E+00 |
| (4*) | 3.33890E−01 | 1.00000E+00 | −1.74972E−02 | 3.02264E−03 | −3.54325E−05 |
| (5*) | 2.30947E−01 | 0.00000E+00 | −4.72977E−03 | 4.64555E−03 | 0.00000E+00 |
| (6*) | −1.61316E−01 | 0.00000E+00 | 4.65267E−03 | 9.94177E−03 | −2.02354E−03 |
| (8*) | 2.86533E−01 | 0.00000E+00 | −3.21225E−02 | 1.98839E−02 | −3.87916E−03 |
| (9*) | 1.92308E+00 | −1.50000E+00 | −4.49547E−03 | −1.59281E−02 | 5.22078E−03 |
| (10*) | −4.68165E−01 | −1.25000E+00 | 1.40813E−02 | −1.26578E−03 | 1.30739E−03 |

As shown in Table 4, in the wide-angle lens 100 of this embodiment, the focal length f0 of the entire lens system is 1.295 mm, the object-to-image distance is 15.480 mm, the F value of the entire lens system is 2.400, and the maximum field angle is 179.185 deg.

The first lens 10 is the negative meniscus lens in which the lens surface 12 (the second surface (2)) on the image side Lb is the concave curved surface, and the lens surface 11 (the first surface (1)) on the object side La is the convex curved surface. The first lens 10 is the glass lens, and the lens surface 11 (the first surface (1)) and the lens surface 12 (the second surface (2)) are spherical. The lens material having the refractive index of 1.839 and the Abbe number of 42.72 is used for the first lens 10, and the focal length thereof is −4.807 mm.

The second lens 20 is the biconcave lens in which both of the lens surface 21 (the third surface (3)) on the object side La and the lens surface 22 (the fourth surface (4)) on the image side Lb are the concave curved surfaces, and has the negative power. The second lens 20 is the plastic lens, and the lens surface 21 (the third surface (3)) and the lens surface 22 (the fourth surface (4)) are aspheric. The lens material having the refractive index of 1.539 and the Abbe number of 55.98 is used for the second lens 20, and the focal length thereof is −3.535 mm.

The third lens 30 is the biconvex lens in which both of the lens surface 31 (the fifth surface (5)) on the object side La and the lens surface 32 (the sixth surface (6)) on the image side Lb are the convex curved surfaces, and has the positive power. The third lens 30 is the plastic lens, and the lens surface 31 (the fifth surface (5)) and the lens surface 32 (the sixth surface (6)) are aspheric. The lens material having the refractive index of 1.646 and the Abbe number of 23.49 is used for the third lens 30, and the focal length thereof is 4.350 mm.

The fourth lens 40 is the negative lens in which the lens surface 42 on the image side Lb is the concave curved surface. In this embodiment, the lens surface 41 (the eighth surface (8)) on the object side La of the fourth lens 40 is the convex curved surface, and the fourth lens 40 is the negative meniscus lens. The fourth lens 40 is the plastic lens, and the lens surface 41 (the eighth surface (8)) and the lens surface 42 are aspheric. The lens material having the refractive index of 1.587 and the Abbe number of 30.17 is used for the fourth lens 40, and the focal length thereof is −1.156 mm.

The fifth lens 50 is the biconvex lens in which both of the lens surface 51 on the object side La and the lens surface 52 (the tenth surface (10)) on the image side Lb are the convex curved surfaces. The fifth lens 50 is the plastic lens, and the lens surface 51 and the lens surface 52 (the tenth surface (10)) are aspheric. The lens material having the refractive index of 1.539 and the Abbe number of 55.98 is used for the fifth lens 50, and the focal length thereof is 1.260 mm.

The fourth lens 40 and the fifth lens 50 constitute the cemented lens 60. Accordingly, the joint surface between the lens surface 42 on the image side Lb of the fourth lens 40 and the lens surface 51 on the object side La of the fifth lens 50 is set as the ninth surface (9).

In the thus-configured wide-angle lens 100, the composite focal length f123 of the lenses in the front group (the first lens 10, the second lens 20, and the third lens 30) that is located on the object side La from the diaphragm 72 is 84.005 mm, and the composite focal length f45 of the lenses in the rear group (the cemented lens 60) that is located on the object side La from the diaphragm 72 is 3.646 mm.

The composite focal length f12 of the first lens 10 and the second lens 20 is −1.573 mm, and the composite focal length f345 of the third lens 30 and the cemented lens 60 (the fourth lens 40 and the fifth lens 50) is 3.770 mm.

As shown in FIG. 7 to FIG. 10, in such a wide-angle lens 100, the spherical aberration, the chromatic aberration of magnification, the astigmatism (the distortion), and the lateral aberration are corrected to the appropriate levels.

In the wide-angle lens 100 of this embodiment, the values associated with the conditional expressions (1) to (6) described in the first embodiment are shown in Table 3, and the wide-angle lens 100 in this embodiment satisfies the conditional expressions (1) to (6). Accordingly, also in the wide-angle lens 100 of this embodiment, since the lens surface 22 on the image side of the second lens 20 can be made to the shallow concave curved surface, it is possible to exert similar effects to those of the first embodiment, such as the effect that the second lens 20 can have the structure that is easily manufactured.

Further more specifically, the refractive index n1 of the first lens 10 is 1.839, which satisfies the conditional expression (1). The focal length f2 of the second lens 20 is −3.535 mm, and the focal length f0 of the entire lens system is 1.295 mm. Thus, f2/f0 is −2.730, which satisfies the conditional expression (2). The radius of curvature R22 of the lens surface 22 on the image side Lb of the second lens 20 is 2.995 mm, and the distance d23 on the optical axis between the lens surface 22 on the image side Lb of the second lens 20 and the lens surface 31 on the object side La of the third lens 30 is 1.240. Thus, R22/d23 is 2.415, which satisfies the conditional expression (3). The focal length f1 of the first lens 10 is −4.807 mm, and the focal length f0 of the entire lens system is 1.295 mm. Thus, f1/f0 is −3.712, which satisfies the conditional expression (4). The composite focal length f12 of the first lens 10 and the second lens 20 is −1.573 mm, and the focal length f0 of the entire lens system is 1.295 mm. Thus, f12/f0 is −1.215, which satisfies conditional expression (5). The composite focal length f12 of the first lens 10 and the second lens 20 is −1.573 mm, and the composite focal length f345 of the third lens 30, the fourth lens 40, and the fifth lens 50 is 3.770 mm. Thus, f12/f345 is 0.417, which satisfies the conditional expression (6).

Third Embodiment

Figure 11:
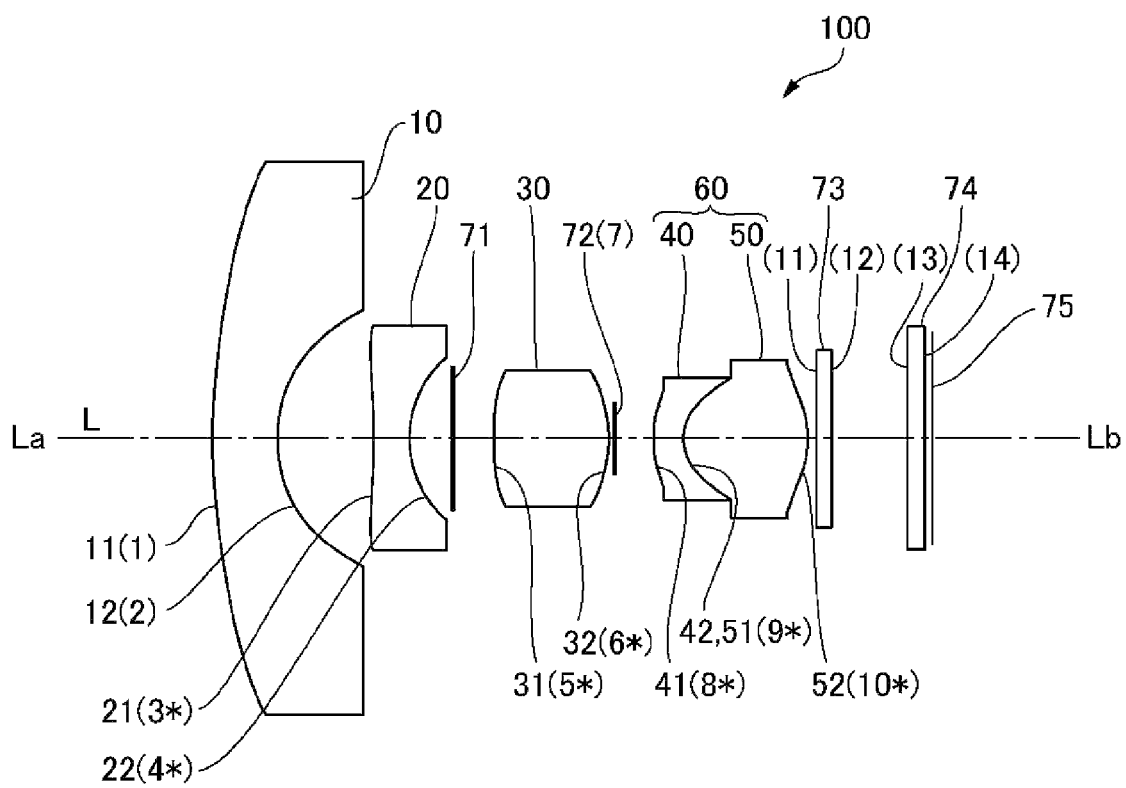
FIG. 11 is an explanatory view of a wide-angle lens according to a third embodiment of the present invention.
Figure 12:
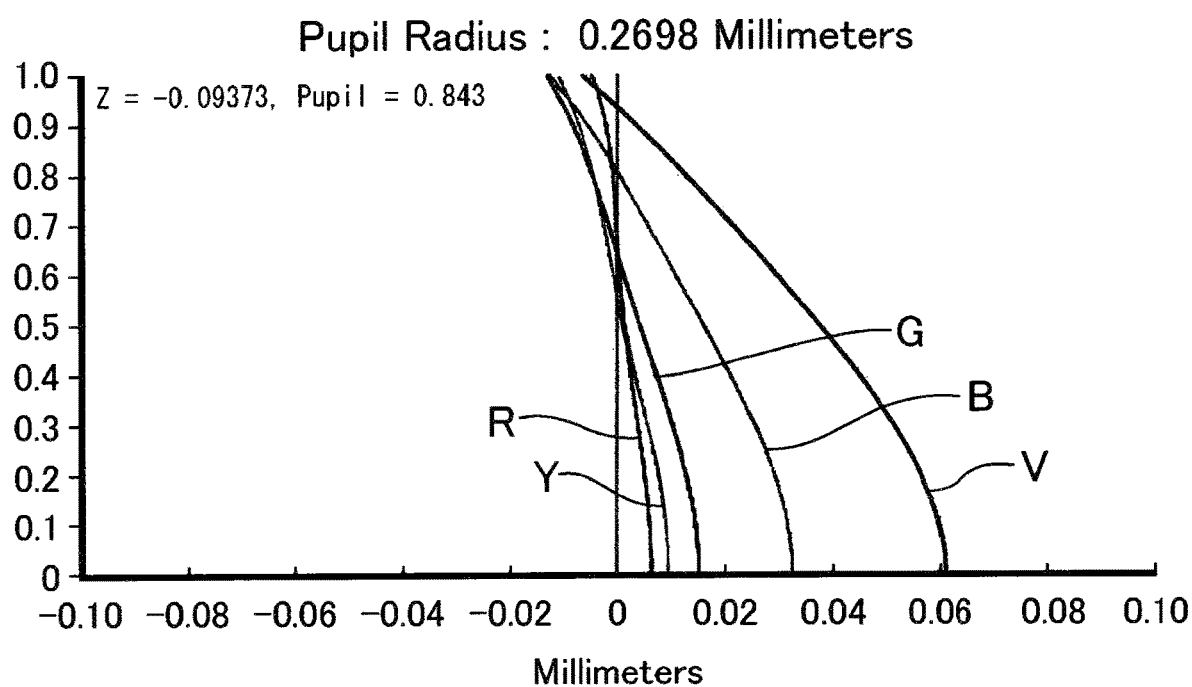
FIG. 12 is an explanatory graph showing a spherical aberration of the wide-angle lens shown in FIG. 11.
Figure 13:
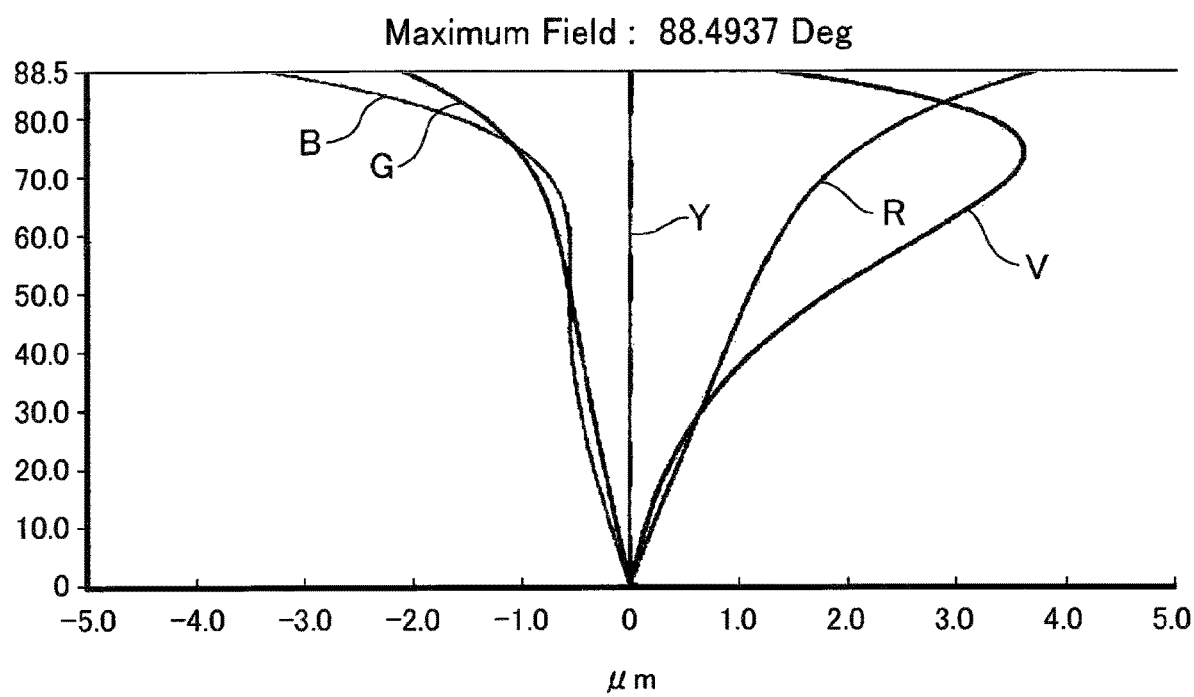
FIG. 13 is an explanatory graph showing a chromatic aberration of magnification of the wide-angle lens shown in FIG. 11.
Figure 14:
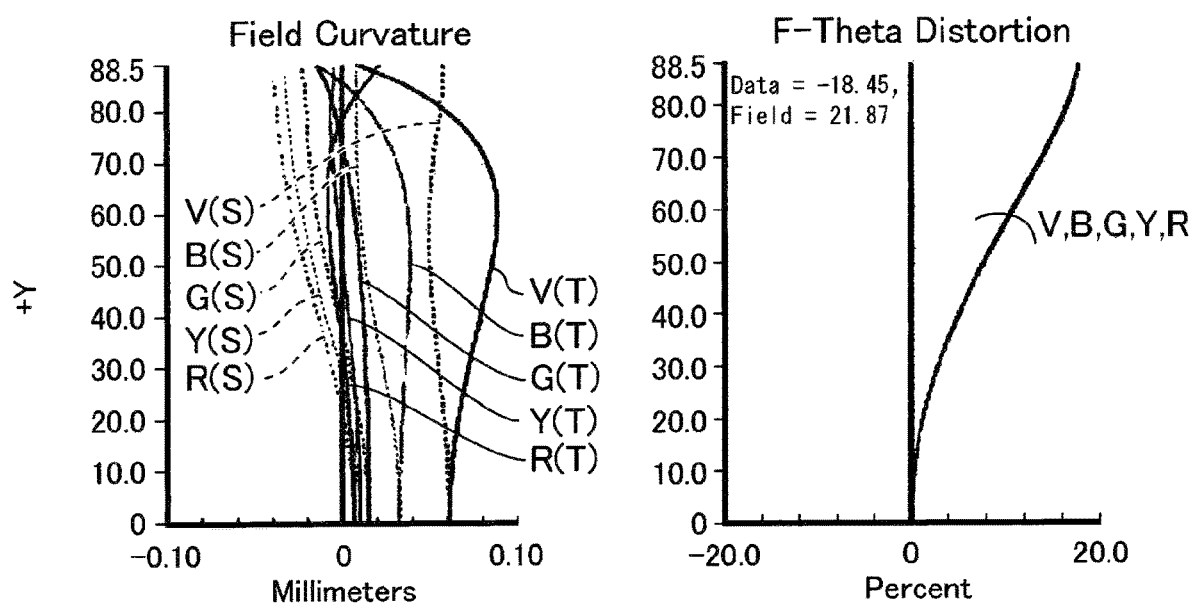
FIG. 14 includes explanatory graphs showing astigmatism and distortion of the wide-angle lens shown in FIG. 11.
Figure 15:
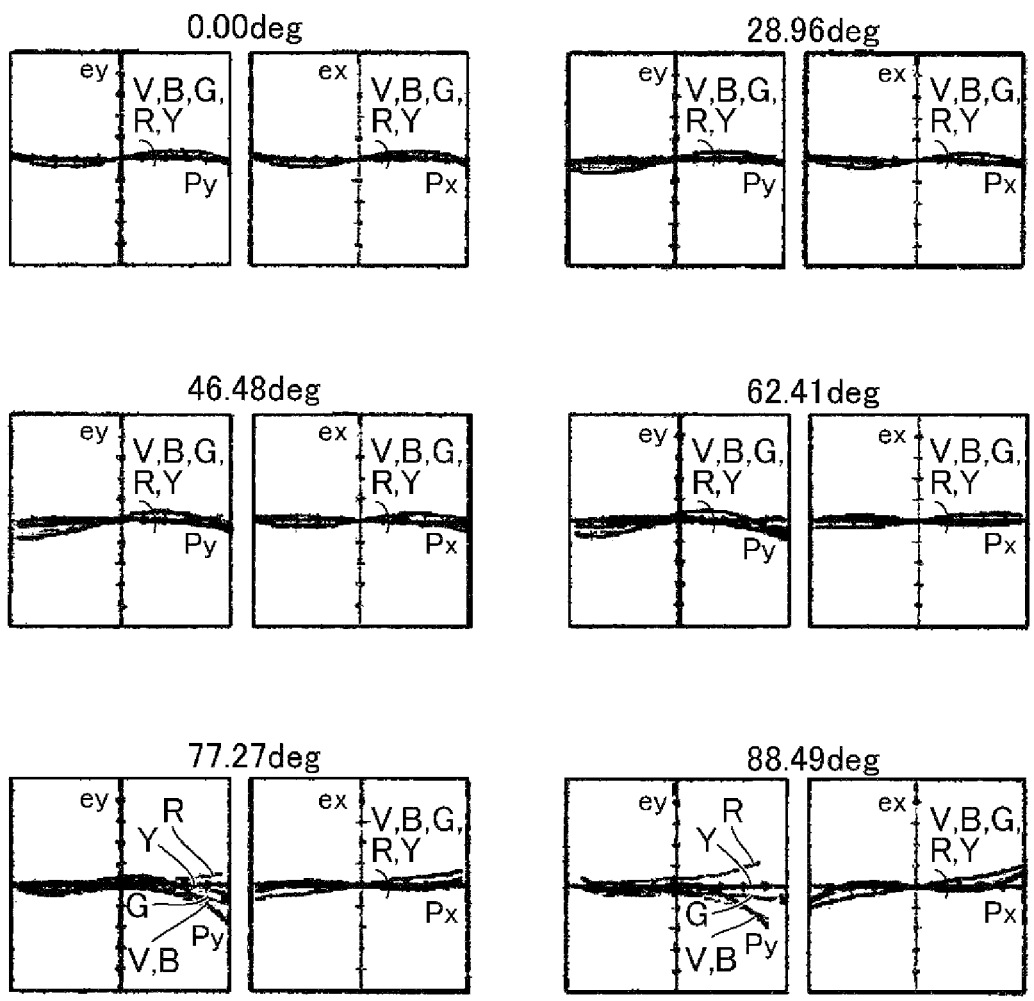
FIG. 15 includes explanatory views showing a lateral aberration of the wide-angle lens shown in FIG. 11.

FIG. 11 is an explanatory view of the wide-angle lens 100 according to the third embodiment of the present invention. FIG. 12 is an explanatory graph showing a spherical aberration of the wide-angle lens 100 shown in FIG. 11. FIG. 13 is an explanatory graph showing a chromatic aberration of magnification of the wide-angle lens 100 shown in FIG. 11, and shows a chromatic aberration of magnification at a maximum field angle. FIG. 14 includes explanatory graphs showing astigmatism and distortion of the wide-angle lens 100 shown in FIG. 11. FIG. 15 includes explanatory views showing a lateral aberration of the wide-angle lens 100 shown in FIG. 11. FIG. 15 collectively shows the lateral aberrations of the red light R, the yellow light Y, the green light G, the blue light B, and the violet light V in the two directions (the y-direction and the x-direction), which are orthogonal to the optical axis, at angles of 0.00 deg, 28.96 deg, 46.48 deg, 62.41 deg, 77.27 deg, and 88.49 deg. Since a basic configuration of this embodiment is similar to that of the first embodiment, corresponding portions will be denoted by the same reference numerals, and a description on those will not be made.

As shown in FIG. 11, similar to the first embodiment, the wide-angle lens 100 of this embodiment also includes the first lens 10, the second lens 20, the annular light-shielding sheet 71, the third lens 30, the diaphragm 72, the fourth lens 40, and the fifth lens 50 that are arranged in this order from the object side La to the image side Lb, and the flat plate-shaped infrared filter 73, the translucent cover 74, and the imaging element 75 are arranged in this order on the image side Lb from the fifth lens 50.

A configuration and the like of each of the lens of the wide-angle lens 100 in this embodiment are as shown in Table 6, and Table 7 shows the aspheric coefficients A4, A6, A8 of the aspheric lenses used for the wide-angle lens 100 in this embodiment.

TABLE 6

| Effective Focal Length | 1.296 mm |
| Total Track | 15.402 mm |
| Image Space F/# | 2.400 |
| Max. Field of Angle | 176.987 deg |

| Surf | Radius | Thickness | Nd | vd | f | f | f | Diameter | Sag |
|---|---|---|---|---|---|---|---|---|---|
| (1) | 16.500 | 1.400 | 1.839 | 42.72 | −4.679 | −1.603 | 2.767 | 12.000 | 1.130 |
| (2) | 3.050 | 2.075 | | | | | | 5.800 | 2.105 |
| (3*) | −13.570 | 0.755 | 1.539 | 55.98 | −3.640 | | | 7.000 | 0.137 |
| (4*) | 2.337 | 1.800 | | | | | | 3.800 | 1.036 |
| (5*) | 4.701 | 2.470 | 1.587 | 30.17 | 3.403 | 3.647 | | 4.000 | 0.419 |
| (6*) | −2.799 | 0.084 | | | | | | 4.000 | −0.648 |
| (7(stop)) | Infinity | 0.891 | | | | | | | |
| (8*) | 5.190 | 0.610 | 1.646 | 23.49 | −1.504 | | 4.886 | 3.200 | 0.240 |
| (9*) | 0.780 | 2.668 | 1.539 | 55.98 | 1.544 | | | 3.200 | 1.412 |
| (10*) | −2.465 | 0.200 | | | | | | 4.000 | −0.468 |
| (11) | Infinity | 0.300 | | | | | | | |
| (12) | Infinity | 1.624 | | | | | | | |
| (13) | Infinity | 0.400 | | | | | | | |
| (14) | Infinity | 0.125 | | | | | | | |

TABLE 7

| Surf | c (1/Radius) | K | A4 | A6 | A8 |
|---|---|---|---|---|---|
| (3*) | −7.36920E−02 | 0.00000E+00 | 5.82100E−03 | −1.50700E−04 | 0.00000E+00 |
| (4*) | 4.27936E−01 | 4.00000E−01 | −1.78000E−02 | 2.29300E−03 | −3.17800E−04 |
| (5*) | 2.12712E−01 | 0.00000E+00 | −1.05550E−02 | 7.56000E−04 | 3.62700E−04 |
| (6*) | −3.57232E−01 | −1.43000E+00 | 4.41600E−03 | −6.13500E−04 | 0.00000E+00 |
| (8*) | 1.92678E−01 | 0.00000E+00 | −1.28600E−02 | 7.33000E−03 | −1.20300E−03 |
| (9*) | 1.28205E+00 | −1.50000E+00 | 1.00000E−02 | 8.18600E−03 | 4.89300E−04 |
| (10*) | −4.05680E−01 | −1.50000E+00 | 1.09000E−02 | 6.23500E−04 | 2.80000E−04 |

As shown in Table 6, in the wide-angle lens 100 of this embodiment, the focal length f0 of the entire lens system is 1.296 mm, the object-to-image distance is 15.402 mm, the F value of the entire lens system is 2.400, and the maximum field angle is 176.987 deg.

The first lens 10 is the negative meniscus lens in which the lens surface 12 (the second surface (2)) on the image side Lb is the concave curved surface, and the lens surface 11 (the first surface (1)) on the object side La is the convex curved surface. The first lens 10 is the glass lens, and the lens surface 11 (the first surface (1)) and the lens surface 12 (the second surface (2)) are spherical. The lens material having the refractive index of 1.839 and the Abbe number of 42.72 is used for the first lens 10, and the focal length thereof is −4.679 mm.

The second lens 20 is the biconcave lens in which both of the lens surface 21 (the third surface (3)) on the object side La and the lens surface 22 (the fourth surface (4)) on the image side Lb are the concave curved surfaces, and has the negative power. The second lens 20 is the plastic lens, and the lens surface 21 (the third surface (3)) and the lens surface 22 (the fourth surface (4)) are aspheric. The lens material having the refractive index of 1.539 and the Abbe number of 55.98 is used for the second lens 20, and the focal length thereof is −3.640 mm.

The third lens 30 is the biconvex lens in which both of the lens surface 31 (the fifth surface (5)) on the object side La and the lens surface 32 (the sixth surface (6)) on the image side Lb are the convex curved surfaces, and has the positive power. The third lens 30 is the plastic lens, and the lens surface 31 (the fifth surface (5)) and the lens surface 32 (the sixth surface (6)) are aspheric. The lens material having the refractive index of 1.587 and the Abbe number of 30.17 is used for the third lens 30, and the focal length thereof is 3.403 mm.

The fourth lens 40 is the negative lens in which the lens surface 42 on the image side Lb is the concave curved surface. In this embodiment, the lens surface 41 (the eighth surface (8)) on the object side La of the fourth lens 40 is the convex curved surface, and the fourth lens 40 is the negative meniscus lens. The fourth lens 40 is the plastic lens, and the lens surface 41 (the eighth surface (8)) and the lens surface 42 are aspheric. The lens material having the refractive index of 1.646 and the Abbe number of 23.49 is used for the fourth lens 40, and the focal length thereof is −1.504 mm.

The fifth lens 50 is the biconvex lens in which both of the lens surface 51 on the object side La and the lens surface 52 (the tenth surface (10)) on the image side Lb are the convex curved surfaces. The fifth lens 50 is the plastic lens, and the lens surface 51 and the lens surface 52 (the tenth surface (10)) are aspheric. The lens material having the refractive index of 1.539 and the Abbe number of 55.98 is used for the fifth lens 50, and the focal length thereof is 1.544 mm.

The lens surface 42 on the image side Lb of the fourth lens 40 and the lens surface 51 on the object side La of the fifth lens 50 are formed in the same shape, and the fourth lens 40 and the fifth lens 50 constitute the cemented lens 60. Accordingly, the joint surface between the lens surface 42 on the image side Lb of the fourth lens 40 and the lens surface 51 on the object side La of the fifth lens 50 is set as the ninth surface (9).

In the thus-configured wide-angle lens 100, the composite focal length f123 of the lenses in the front group (the first lens 10, the second lens 20, and the third lens 30) that is located on the object side La from the diaphragm 72 is 2.767 mm, and the composite focal length f45 of the lenses in the rear group (the cemented lens 60) that is located on the object side La from the diaphragm 72 is 4.886 mm.

The composite focal length f12 of the first lens 10 and the second lens 20 is −1.603 mm, and the composite focal length f345 of the third lens 30 and the cemented lens 60 (the fourth lens 40 and the fifth lens 50) is 3.647 mm.

As shown in FIG. 12 to FIG. 15, in such a wide-angle lens 100, the spherical aberration, the chromatic aberration of magnification, the astigmatism (the distortion), and the lateral aberration are corrected to the appropriate levels.

In the wide-angle lens 100 of this embodiment, the values associated with the conditional expressions (1) to (6) described in the first embodiment are shown in Table 3, and the wide-angle lens 100 in this embodiment satisfies the conditional expressions (1) to (6). Accordingly, also in the wide-angle lens 100 of this embodiment, since the lens surface 22 on the image side Lb of the second lens 20 can be made to the shallow concave curved surface, it is possible to exert similar effects to those of the first embodiment, such as the effect that the second lens 20 can have the structure that is easily manufactured.

Further more specifically, the refractive index n1 of the first lens 10 is 1.839, which satisfies the conditional expression (1). The focal length f2 of the second lens 20 is −3.640 mm, and the focal length f0 of the entire lens system is 1.296 mm. Thus, f2/f0 is −2.809, which satisfies the conditional expression (2). The diameter radius of curvature R22 of the lens surface 22 on the image side Lb of the second lens 20 is 2.337 mm, and the distance d23 on the optical axis between the lens surface 22 on the image side Lb of the second lens 20 and the lens surface 31 on the object side La of the third lens 30 is 1.800. Thus, R22/d23 is 1.298, which satisfies the conditional expression (3). The focal length f1 of the first lens 10 is −4.679 mm, and the focal length f0 of the entire lens system is 1.296 mm. Thus, f1/f0 is −3.610, which satisfies the conditional expression (4). The composite focal length f12 of the first lens 10 and the second lens 20 is −1.603 mm, and the focal length f0 of the entire lens system is 1.296 mm. Thus, f12/f0 is −1.237, which satisfies the conditional expression (5). The composite focal length f12 of the first lens 10 and the second lens 20 is −1.603 mm, and the composite focal length f345 of the third lens 30, the fourth lens 40, and the fifth lens 50 is 3.647 mm. Thus, f12/f345 is 0.440, which satisfies the conditional expression (6).

Other Embodiments

In the above embodiments, the first lens 10 is the glass lens. However, the first lens 10 may be the plastic lens. In this case, the lens surface 11 on the image side Lb of the first lens 10 can be made to aspheric.

DESCRIPTION OF REFERENCE NUMERALS

10 First lens
20 Second lens
30 Third lens
40 Fourth lens
50 Fifth lens
60 Cemented lens
71 Light-shielding sheet
72 Diaphragm
73 Infrared filter
74 Cover
75 Imaging element

The invention claimed is:

1. A wide-angle lens comprising:
   a plurality of lenses; and
   a diaphragm,
   wherein the plurality of lenses are a first lens, a second lens, a third lens, a fourth lens, and a fifth lens that are arranged in this order from an object side,
   the diaphragm is arranged between the third lens and the fourth lens,
   the first lens is a negative meniscus lens in which a lens surface on an image side is a concave curved surface,
   the second lens is a biconcave lens in which both of a lens surface on the object side and a lens surface on the image side are concave curved surfaces,
   the third lens is a biconvex lens in which both of a lens surface on the object side and a lens surface on the image side are convex curved surfaces,
   the fourth lens is a negative lens in which a lens surface on the image side is a concave curved surface,
   the fifth lens is a biconvex lens in which both of a lens surface on the object side and a lens surface on the image side are convex curved surfaces, and
   when a refractive index of the first lens is set as n1, a focal length of the second lens is set as f2, and a focal length of an entire lens system is set as f0, the refractive index n1, the focal length f2, and the focal length f0 satisfy both of the following conditional expressions, $1.800 < n1$ $-3.000 < f2/f0 < -2.500$, wherein
   when a focal length of the first lens is set as f1, the focal length f1 and the focal length f0 satisfy the following conditional expression, $-5.000 < f1/f0 < -1.000$.

2. The wide-angle lens according to claim 1, wherein all of the second lens, the third lens, the fourth lens, and the fifth lens are plastic lenses.

3. The wide-angle lens according to claim 1, wherein when a radius of curvature of the lens surface on the image side of the second lens is set as R22, and a distance on an optical axis between the lens surface on the image side of the second lens and the lens surface on the object side of the third lens is set as d23, the diameter radius of curvature R22 and the distance d23 satisfy the following conditional expression, $1.000 < R22/d23 < 2.500$.

4. The wide-angle lens according to claim 1, wherein when a composite focal length of the first lens and the second lens is set as f12, the composite focal length f12 and the focal length f0 satisfy the following conditional expression, $-2.500 < f12/f0 < -0.500$.

5. The wide-angle lens according to claim 1, wherein when a composite focal length of the first lens and the second lens is set as f12, and a composite focal length of the third lens, the fourth lens, and the fifth lens is set as f345, the composite focal lengths f12 and f345 satisfy the following conditional expression, $-1.000 < f12/f345 < 0$.

* * * * *